3,828,054
N-ACYL AND N-PYRIDYLCARBONYL OR SULFONYL MONO- OR DI-SUBSTITUTED SULFAMOYLBENZENESULFONAMIDES

James M. Sprague, Gwynedd Valley, and Carl Ziegler, Glenside, Pa., assignors to Merck & Co. Inc., Rahway, N.J.

No Drawing. Original application Sept. 26, 1969, Ser. No. 870,380, now Patent No. 3,709,917, dated Jan. 9, 1973. Divided and this application Oct. 4, 1972, Ser. No. 295,075

Int. Cl. C07d *31/50*
U.S. Cl. 260—294.8 F     4 Claims

ABSTRACT OF THE DISCLOSURE

N-Acyl and N-organosulfonyl mono-substituted or di-substituted sulfamoylbenzenesulfonamides and salts thereof wherein the benzene ring may be substituted by halo, alkyl, trihalo lower alkyl, nitro, cyano, carboxy or a hydrocarbylene moiety. The products are prepared by either of two routes: (1) by treating a mono- or di-substituted sulfamoylbenzenesulfonamide with an acyl halide (or organosulfonyl halide) or with a carboxylic acid anhydride (or organosulfonic acid anhydride), or (2) by treating a mono- or di-substituted sulfamoylbenzenesulfonyl halide with a salt of a acyl (or organosulfonyl)amide. The products are useful in the treatment of gout and gouty arthritis.

---

This is a division of application Ser. No. 870,380, filed Sept. 26, 1969, now U.S. No. 3,709,917 dated Jan. 9, 1973.

This invention relates to a new class of chemical compounds which can be described generally as N-acyl and N-organosulfonyl mono-substituted or di-substituted sulfamoylbenzenesulfonamides and salts thereof. It is also an object of this invention to describe novel methods for the preparation of the N-acyl and N-organosulfonyl mono-substituted or di-substituted sulfamoylbenzenesulfonamides.

Pharmacological studies show that the instant products are effective uricosuric agents which can be used in the treatment of *gout* and *gouty arthritis* by increasing the excretion of uric acid by the kidney. The instant products are also a valuable adjuvant for inhibiting the excretion of penicillin, thus maintaining high antibiotic levels in the treatment of conditions that require intensive penicillin therapy.

The N-acyl and N-organosulfonyl mono-substituted and di-substituted sulfamoylbenzenesulfonamides of this invention are compounds having the following structural formula:

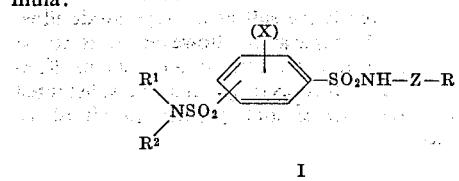

I wherein R is alkyl, for example, lower alkyl such as methyl, ethyl, n-propyl, isopropyl, n-butyl and the like, cycloalkyl, for example, cycloalkyl containing from 5 to 6 nuclear carbon atoms such as cyclopentyl, cyclohexyl and the like, cycloalkylalkyl, for example, a mononuclear cycloalkyl substituted lower alkyl moiety wherein the cycloalkyl group contains from 5 to 6 nuclear carbon atoms such as cyclopentylmethyl, cyclohexylmethyl and the like, alkenyl, for example, lower alkenyl such as allyl and the like, alkynyl, for example, lower alkynyl such as 2-propynyl and the like, haloalkyl, for example, a mono-halo-substituted lower alkyl, such as chloromethyl, 2-chloroethyl and the like, polyhalo-substituted lower alkyl, for example, dihalo lower alkyl such as dichloromethyl, 2,2-dichloroethyl and the like and trihalo lower alkyl such as trichloromethyl, 2,2,2 - trichloroethyl, 3,3,3-trichloro-n-propyl, 3,3-dichloro-1-chloropropyl and the like, aryl for example, mononuclear aryl such as phenyl and the like, aralkyl, for example, mononuclear aralkyl such as benzyl and the like, dialkylsulfamoylsubstituted aryl, for example, di-lower alkylsulfamoyl-substituted mononuclear aryl such as di-n-butylsulfamoylphenyl and the like or a 5- or 6-membered heterocycle bonded either directly via a nuclear carbon or indirectly via a methylene chain (i.e., —CH$_2$—) to the carbonyl or sulfonyl moiety represented by Z and in which the heterocycle contains a single hetero atom selected from oxygen, nitrogen or sulfur, thus, suitable heterocycles include, for example, such moieties as furyl, pyrrolidinyl, pyridyl, for example, 2- pyridyl and the like, 2, 3 or 4-piperidyl, 2-pyridylmethyl, 2, 3 or 4-piperidylmethyl, furfuryl, 2 or 3-thienyl or pyrrolyl such as 2-pyrrolyl and the like; $R^1$ is hydrogen or alkyl, for example, lower alkyl such as ethyl, n-propyl, n-butyl, pentyl, hexyl and the like, cycloalkyl, for example, a mononucear cycloalkyl containing from 5 to 6 nuclear carbon atoms, such as cyclopentyl, cyclohexyl and the like; $R^2$ is alkyl, for example, lower alkyl such as ethyl, n-propyl, n-butyl, pentyl, hexyl and the like, cycloalkyl, for example, a mononuclear cycloalkyl containing from 5 to 6 nuclear carbon atoms, such as cyclopentyl, cyclohexyl and the like, and $R^1$ and $R^2$ taken together may be joined with the nitrogen to which they are attached to form a saturated 5- or 6-membered heterocyclic ring such as 1-pyrrolidinyl, morpholino, piperidino and the like; X is halo, for example, bromo, chloro, fluoro and the like, lower alkyl such as methyl and the like, nitro, trihalomethyl such as trifluoromethyl and the like, cyano or carboxy and the like or two X radicals on adjacent carbon atoms of the benzene ring may be joined to form a hydrocarbylene chain containing from 3 to 4 carbon atoms between their ponts of attachment, for example, trimethylene, tetramethylene or 1,3-butadienyl (i.e.,

Z is carbonyl or sulfonyl and *m* is an integer having a value of 0–4 and the non-toxic, pharmaceutically acceptable salts thereof as, for example, the alkali metal and alkaline earth metal salts such as are derived from sodium, calcium, magnesium and the like, or salts of secondary amines such as dialkylamines or heterocyclic amines such as dimethylamines, diethylamine, pyrrolidine, piperidine, pyridine or morpholine and the like.

A preferred embodiment of this invention relates to the N-acyl (or N-organosulfonyl) di-substituted sulfamoylbenzenesulfonamides having the following structural formula:

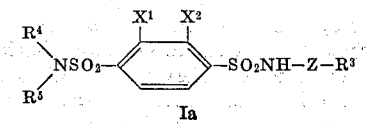

Ia wherein $R^3$ is lower alkyl or a 5-membered heterocycle containing a single oxygen atom such as furyl and the like, $R^4$ and $R^5$ are lower alkyl, z is carbonyl or sulfonyl and $X^1$ and $X^2$ are hydrogen, halo, lower alkyl, trihalomethyl or nitro or taken together with the nuclear carbons to which they are attached, the $X^1$ and $X^2$ may be joined to form a 1,3-butadienylene chain (i.e.,

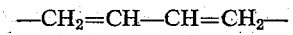

and the alkali metal or alkaline earth metal salts thereof. This class of compounds exhibits particularly good uricosuric activity and represents a preferred subgroup of compounds within the scope of this invention.

The N-acyl and N-organosulfonyl mono-substituted and di-substituted sulfamoylbenzenesulfonamides of this invention are conveniently prepared by either of two alternate processes. One such method comprises treating a mono-substituted or a di-substituted sulfamoylbenzenesulfonamide with either an acyl halide (or organosulfonyl)halide or with a carboxylic acid anhydride (or organosulfanic)anhydride. A second method comprises treating the appropriate sulfamoyl-substituted benzenesulfonyl halide with a salt of an acyl (or organosulfonyl)-amide.

Specifically, the first of the above-mentioned processes comprises the reaction of a mono-substituted or di-substituted sulfamoylbenzenesulfonamide (II, infra) with either a suitable acyl halide or an organosulfonyl halide or with a suitable carboxylic acid anhydride or organosulfonic acid anhydride, preferably, in the presence of a strong inorganic acid such as sulfuric acid and the like. The reaction may be conducted at a temperature of from about 20° C. to about 100° C. and any solvent in which the reactants are reasonably soluble and substantially inert may be employed. Suitable solvents include, for example, hydrocarbons such as benzene, toluene and the like, tertiary amines, for example, trialkylamines and heterocyclic amines such as trimethylamine, pyridine and the like. Also, in addition to the foregoing, an excess of the acyl halide or carboxylic acid anhydride which is employed as the reactant in the process may be used as the diluent; however, when an organosulfonyl halide is employed, it is advisable to add a small amount of a tertiary amine to the reaction mixture. The following equation which describes the use of an acyl halide reactant illustrates this process; however, it is to be understood that by substituting the corresponding known organosulfonyl halides, carboxylic acid anhydrides or organosulfonic acid anhydrides for the acyl halide depicted infra, an identical product may be obtained:

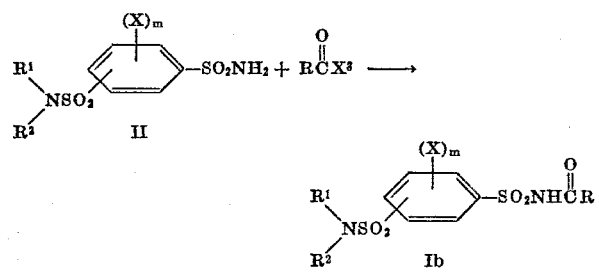

wherein R, $R^1$, $R^2$, X and m are as defined above and $X^3$ is halo such as bromo, chloro, fluoro and the like. Representative of the acyl halides which may be employed are alkanoyl halides such as a lower alkanoyl halide including acetyl chloride, n-propionyl chloride, n-butyryl chloride and the like, cycloalkylcarbonyl halides containing from 5–6 nuclear carbon atoms such as cyclopentylcarbonyl chloride, cyclohexylcarbonyl chloride and the like, cycloalkyl substituted alkanoyl halides as, for example, a mononuclear cycloalkyl substituted lower alkanoyl halide containing from 5–6 nuclear carbon atoms such as cyclopentylacetyl chloride, cyclohexylacetyl chloride and the like, alkenoic acid halides such as 3-butenoyl chloride and the like, alkynoic acid halides such as 3-butynoic acid chloride and the like, halo-substituted lower alkanoyl halides as, for example, chloroacetyl chloride, 3-chloropropionyl chloride and the like, polyhalo-substituted lower alkanoyl halides as, for example, dihalo loweralkanoyl halides such as dichloroacetyl chloride, 3,3-dichloropropionyl chloride and the like, trihalo lower alkanoyl halide such as trichloroacetyl chloride, 3,3,3-trichloropropionyl chloride, 4,4,4-trichlorobutyryl chloride or 4,4-dichloro-2-chlorobutyryl chloride and the like, arylcarbonyl halides, for example, mononuclear arylcarbonyl halides such as benzoyl chloride and the like, aralkylcarbonyl halides, for example, mononuclear aralkylcarbonyl halides, such as phenylacetyl chloride and the like, a suitable 5- or 6-membered heterocyclic acyl halide such as 2-furoyl chloride, 2-pyrrolidinecarbonyl chloride, 2, 3, or 4-piperidinecarbonyl chloride, 2-pyridineacetyl chloride, 2, 3 or 4-piperidineacetyl chloride, furanacetyl chloride, 2 or 3-thiophenecarbonyl chloride or 2 or 3-pyrrolecarbonyl chloride and the like. Representative of the carbonylic acid anhydrides which may be employed are the alkanoic acid anhydrides, for example, the lower alkanoic acid anhydrides such as acetic anhydride, n-propionic anhydride, n-butyric anhydride and the like; cycloalkylformic acid anhydrides, cycloalkylalkanoic acid anhydrides, for example, mononuclear cycloalkyl-lower alkanoic anhydrides containing from 5 to 6 nuclear carbon atoms such as cyclopentaneacetic anhydride, cyclohexaneacetic anhydride and the like, alkenoic acid anhydrides, for example, lower alkenoic acid anhydrides such as 3-butenoic acid anhydride and the like, alkynoic acid anhydrides, for example, lower ankynoic acid anhydrides such as 3-butynoic acid anhydride and the like, halo-substituted lower alkanoic acid anhydrides, for example, chloroacetic acid anhydride, 3-chloropropionic acid anhydride and the like, polyhalo-substituted lower alkanoic acid anhydrides, for example, dihalo lower alkanoic acid anhydrides such as dichloroacetic anhydride, 3,3-dichloro propionic anhydride and the like, trihalo lower alkanoic acid anhydrides such as trichloroacetic acid anhydride, 3,3,3-trichloropropionic acid anhydride, 4,4,4-trichlorobutyric acid anhydride, 4,4-dichloro-2-chlorobutyric acid anhydride and the like, arylcarboxylic acid anhydrides, for example, mononuclear arylcarboxylic acid anhydrides such as benzoic acid anhydride and the like, aralkanoic acid anhydrides, for example, mononuclear aralkanoic acid anhydrides such as phenylacetic acid anhydride and the like, 5- or 6-membered heterocyclic carboxylic acid anhydrides such as furoyl anhydride, 2-pyrrolidinylcarboxylic acid anhydride, 2, 3 or 4-piperidylcarboxylic acid anhydride, 2-pyridylacetic acid anhydride, 2, 3 or 4-piperidylacetic acid anhydride, furylacetic acid anhydride, 2 or 3-trienylcarbonic acid anhydride and the like.

A second method for preparing the N-acyl mono- or di-substituted sulfamoylbenzenesulfonamides and also a method for preparing the N-organosulfonyl mono-substituted or di-substituted sulfamoylbenzenesulfonamides of this invention comprises treating a mono-or di-substituted sulfamoylbenzenesulfonyl halide (III, infra) with either a salt of a suitable acyl amide or with a salt of a suitable organosulfonamide. The reaction may be conducted in any solvent in which the reactants are reasonably soluble and which are inert to the reactants. Suitable solvents include, for example, toluene, benzene, diethyl ether and the like. Temperature is not a particularly critical aspect of this reaction but, in general, temperatures in the range of from about 25° C. to 100° C. are most suitable for conducting the synthesis. The following equation wherein the metal salt employed is the salt of an acyl amide illustrates this method of preparation, however, it is to be understood that the salt derivative or an organosulfonamide of the formula: $(RSO_2NH)_nM$ may be substituted therefor in an otherwise similar process to afford an identical product:

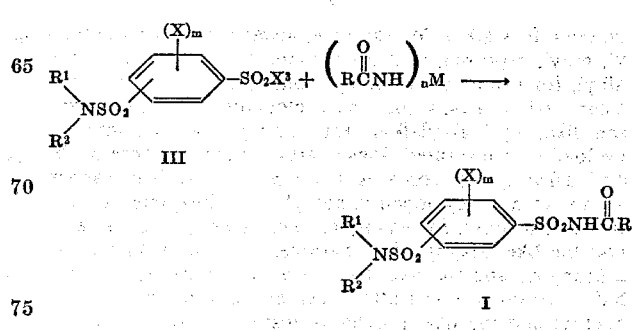

wherein R, R¹, R², X,X³ and $m$ are as defined above and M is the cation derived from an alkali metal such as sodium and the like, an alkaline earth metal such as magnesium and the like or a Group IIb metal such as mercury and the like and $n$ is an integer having a value of 1 when M is the cation derived from an alkali metal and a value of 2 when M is the cation derived from an alkaline earth or Group IIb metal.

If desired, the N-acyl mono- or di-substituted sulfamoylbenzene sulfonamides may be converted to their salts, for example, their alkali metal, alkaline earth metal, ammonium or dialkylammonium salts by treating the N-acyl mono- or disubstituted sulfamoylbenzenesulfonamides with a suitable base as, for example, with an alkali metal alkoxide such as sodium methoxide and the like or with an alkali metal or alkaline earth metal hydroxide or carbonate such as sodium hydroxide, calcium hydroxide, sodium carbonate, magnesium carbonate and the like or with an alkali metal hydride such as sodium hydride and the like or with ammonia or a secondary amine, for example, a dialkylamine or a heterocyclic amine such as dimethylamine, diethylamine or pyridine and the like.

The mono- or di-substituted sulfamoylbenzenesulfonamide (II, supra) employed as the starting material in the preparation of the N-acyl and N-organosulfonyl mono- or disubstituted sulfamoylbenzenesulfonamides (I, supra) is conveniently prepared by one of two alternate processes. One such method of preparation comprises the reaction of a mono- or di-substituted sulfamoylbenzenesulfonyl halide (III, infra) with ammonia. A second method comprises the reaction of a sulfamoylbenzenesulfonyl halide (IV, infra) with a suitable amine.

The first of the above-mentioned processes, i.e., the treatment of a mono- or di-substituted sulfamoylbenzenesulfonyl halide (III, infra) with ammonia is conveniently conducted by adding the mono- or di-substituted sulfamoylbenzenesulfonyl halide to an excess of ammonia, preferably liquid ammonia. The following equation illustrates the process of this reaction:

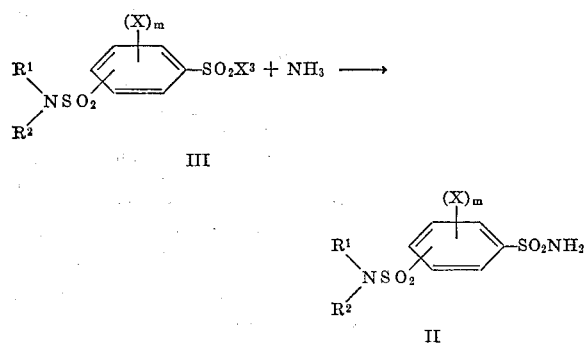

wherein R¹, R², X, X³ and $m$ are as defined above.

The second method for preparing the mono- or disubstituted sulfamoylbenzenesulfonamides (II, infra) comprises the reaction of a sulfamoylbenzenesulfonyl halide (IV, infra) with a suitable amine such as a mono- or di-substituted alkylamine, including a mono- or di-substituted lower alkylamine, such as mono- or diethylamine, mono- or di-n-propylamine, mono- or di-n-butylamine, mono- or di-pentylamine, mono- or dihexylamine and the like, or a heterocyclic amine such as pyrrolidine, morpholine, piperidine and the like. Any solvent which is substantially inert to the reactants may be employed as, for example, acetone, benzene, pyridine and the like; however, we have found it convenient to use as the solvent an excess of the particular amine employed as the starting material in the process. While the temperature at which the reaction is conducted is not critical, it is most desirable to conduct the process at a temperature of from about 25° C. to 100° C. The following equation illustrates this process:

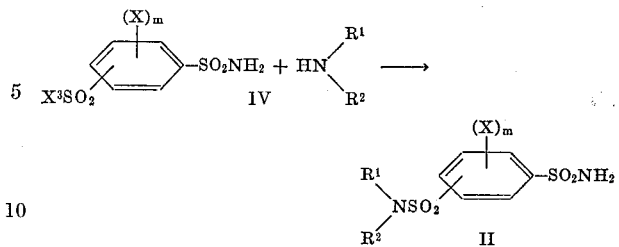

wherein R¹, R², X, X³ and $m$ are as defined above.

The mono- or di-substituted sulfamoylbenzenesulfonyl halides (III) employed as starting materials in the preparation of the mono- or di-substituted sulfamoylbenzene-sulfonamides (II) and also used as starting materials in the preparation of the N-acyl (or N-organosulfonyl) mono- or di-substituted sulfamoylbenzenesulfonamides (I, supra) may be prepared by the diazotization of an appropriate mono- (or di-substituted) sulfamoylaniline (V, infra). The mono- (or di-substituted) sulfamoylaniline is dissolved in a solution of glacial acetic acid and concentrated hydrochloric acid and is then converted to its corresponding diazonium salt by treatment with an aqueous solution of sodium nitrite. The diazonium salt of the mono- (or di-substituted)sulfamoylaniline (Va, infra) is treated with a glacial acetic acid solution of sulfur dioxide and cuprous halide, such as cuprous chloride, cuprous bromide or cuprous fluoride and water. The reaction may be conducted at temperatures of from about 0° C. to 25° C., but it is preferable to conduct the process at 0–5° C. The following equation illustrates this process:

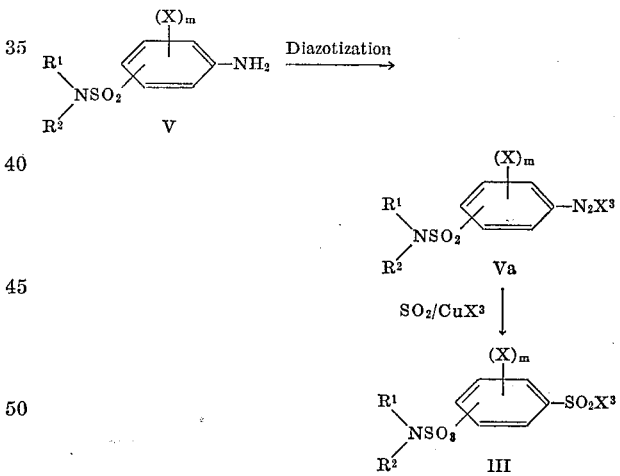

wherein R¹, R², X, X³ and $m$ are as defined above.

The sulfamoylbenzenesulfonyl halides (IV) which are employed as starting materials in the preparation of the mono (or di-substituted)sulfamoylbenzenesulfonamides (II) are prepared by following substantially the diazotization procedure described above for the preparation of the mono- or di-substituted sulfamoylbenzenesulfonyl halides (III, supra). The following equation ilustrates this process:

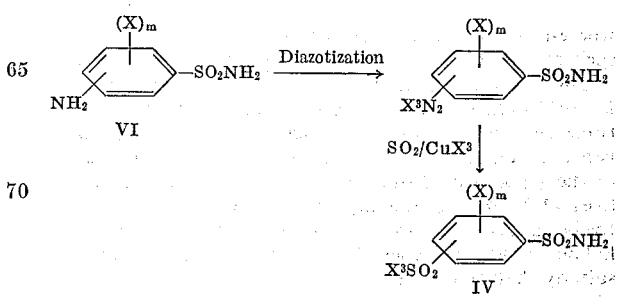

wherein X, X³ and $m$ are as defined above.

The mono- (or di-substituted)sulfamoylanilines (V) employed as intermediates in the preparation of the mono- or di-substituted sulfamoylbenzenesulfonyl halides (III) are prepared by any one of three alternate processes. One such method comprises the hydrolysis of an N-lower alkanoyl mono- (or di-substituted)sulfamoyl aniline; a second method comprises the reduction of the corresponding sulfamoyl-substituted nitrobenzene, and a third method comprises treating a (mono- or di-substituted sulfamoyl)halobenzene with ammonia in an autoclave.

The first of the above-mentioned processes, i.e., the hydrolysis process, comprises hydrolyzing an appropriate N-lower alkanoyl mono- or di-substituted sulfamoylaniline (VII, infra) preferably with an aqueous solution of an inorganic acid such as hydrochloric acid and the like or, alternatively, with an aqueous solution of a base as, for example, an alkali metal hydroxide such as sodium hydroxide, potassium hydroxide and the like. The following equation illustrates this process:

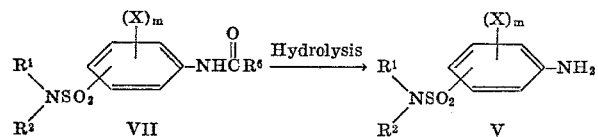

wherein $R^1$, $R^2$, X and $m$ are as defined above and $R^6$ is lower alkyl such as methyl, ethyl, n-propyl and the like.

The second method by which the mono (or di-substituted)sulfamoylanilines (V, infra) may be prepared comprises the reduction of the corresponding mono- or di-substituted sulfamoylnitrobenzene (VIII, infra) either chemically as, for example, with iron powder and the like in an aqueous solution of a lower alkanoic acid such as acetic acid or by catalytic hydrogenation with ruthenium, rhodium or Raney alloy in sodium hydroxide. While the temperature at which the reaction is conducted is not critical, it is most convenient to effect the synthesis at a temperature in the range of from about 25° C. to 100° C. The following equation illustrates this process:

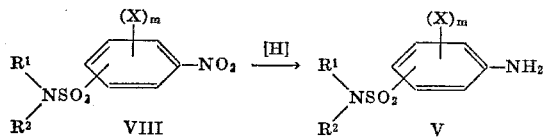

wherein $R^1$, $R^2$, X and $m$ are as defined above.

The third method of preparation and one which is most suitable for preparing the mono- or (di-substituted) sulfamoyl anilines wherein the X substituent is nitro or sulfamoyl comprises treating a mono- or di-substituted sulfamoylhalobenzene (IX, infra) with an alcoholic solution of ammonia in an autoclave at temperatures of from about 100° C. to 150° C. The following equation illustrates this process:

wherein $R^1$, $R^2$, and $m$ are as defined above, $X^5$ is halo such as chloro and the like and $X^4$ is nitro or sulfamoyl.

The N-lower alkanoyl (mono- or di-substituted sulfamoyl)anilines, mono- or di-substituted sulfamoyl nitrobenzenes and mono- or di-substituted sulfamoylhalobenzenes employed as intermediates in the preparation of the (mono- or di-substituted sulfamoyl)aniline derivatives (V) are conveniently prepared by treating, respectively, a lower alkanamido substituted benzenesulfonyl halide, a nitrobenzenesulfonyl halide or a halobenzenesulfonyl halide with a suitable amine as, for example, an alkyl amine, including mono- and di-lower-alkylamines such as mono- and diethylamine, mono- and dipropylamine, mono- and dibutylamine, mono- and dipentylamine, mono- and dihexylamine and the like. Any solvent which is inert to the reactants may be employed. Suitable solvents include, for example, acetone, benzene, pyridine and the like or, alternatively, an excess of the amine which is employed as the reactant in the process may be used as the solvent. The temperature at which the reaction is conducted is not critical, however, we have found it convenient to conduct the reaction at ambient temperature. The following equation illustrates this process:

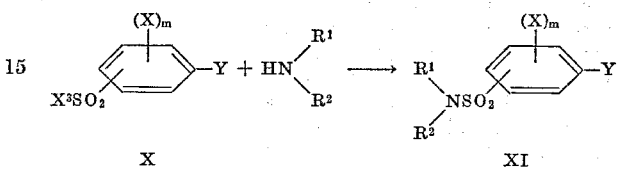

wherein $R^1$, $R^2$, X, $X^3$ and $m$ are as defined above and Y is lower alkanamido such as acetamido, propionamido and the like or nitro or halo.

The lower alkanamido substituted benzenesulfonyl halides employed as reactants in the foregoing process are either known compounds or may be prepared by treating the corresponding anilide (XII, infra) with a halosulfonic acid such as chlorosulfonic acid, fluorosulfonic acid and the like. This reaction is conducted by adding the anilide to the halosulfonic acid at room temperature and when the addition is complete, warming the reaction mixture to complete the reaction. The following equation illustrates this process:

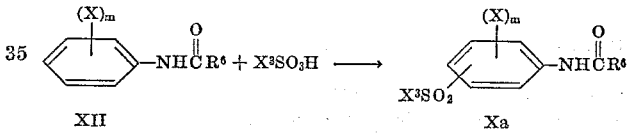

wherein $R^6$, X, $X^3$ and $m$ are as defined above.

Included within the scope of this invention are the non-toxic, pharmaceutically acceptable salts of the instant products. In general, any base which will form a salt with the foregoing N-acyl (or N-organosulfonyl) mono- or di-substituted sulfamoylbenzenesulfonamides and whose pharmacological properties will not cause an adverse physiological effect when ingested by the body system is considered as being within the scope of this invention. Suitable bases for preparing the salts include, for example, the alkali metal and alkaline earth metal hydroxides, carbonates and alkoxides, ammonia, secondary amines, for example, a dialkylamine or a heterocyclic amine such as dimethylamine, diethylamine or pyridine and the like.

The examples which follow illustrate the N-acyl (or N-organosulfonyl) mono- or di-substituted sulfamoylbenzenesulfonamides (I) of this invention and the methods by which they are prepared. However, the examples are illustrative only and it will be apparent to those having ordinary skill in the art that all of the products embraced by formula I, supra, may also be prepared in an analogous manner by substituting the appropriate starting materials for those set forth in the examples.

EXAMPLE 1

N-Acetyl-4-Di-n-butylsulfamoyl-3-Chlorobenzene-sulfonamide

Step A: $N^1,N^1$ - Di-n-butyl-2-Chlorosulfanilamide.—2-Chloro-N-acetylsulfanilyl chloride (18 g.) is added carefully to a mixture of di-n-butylamine (26 g.) in acetone (100 ml.). The reaction is warmed for ½ hour and then the solvent removed to yield $N^4$-acetyl-$N^1,N^1$-di-n-butyl-2-chloro-sulfanilamide to which is added ethanol (25 ml.) and hydrochloric acid (25 ml.). The resulting solution is heated under reflux for 1½ hour. About ½ of the solvent is removed and then the reaction mixture is cooled and made basic with sodium hydroxide solution to precipitate the crude product which is removed by filtration and recrystallized from a mixture of ether and petroleum ether to afford 15.8 g. of $N^1,N^1$-di-n-butyl-2-chlorosulfanilamide, m.p. 107°–109° C.

Elemental analysis for $C_{14}H_{23}ClN_2O_2S$.—Calc.: C, 52.73; H, 7.27; N, 8.79. Found: C, 52.80; H, 6.95; N, 8.70.

Step B: 3-Chloro-4-Di-n-butylsulfamoylbenzenesulfonyl Chloride.—A solution of $N^1,N^1$-di-n-butyl-2-chlorosulfanilamide (11 g.) in glacial acetic acid (50 ml.) and concentrated hydrochloric acid (25 ml.) at 0° C. is converted to the diazonium salt by treatment with a solution of sodium nitrite (2.5 g.) in water (5 ml.). A solution of sulfur dioxide (25 g.) in glacial acetic acid (50 ml.) is prepared to which is added a solution of cupric chloride (2 g.) in water (5 ml.). When the above reactions have been completed, the diazonium salt is added carefully to the sulfur dioxide solution. After 2 hours, ice water is added to precipitate the 3-chloro-4-di-n-butylsulfamoylbenzenesulfonyl chloride. The crude product is dissolved in ether and precipitated with petroleum ether to yield 11.6 g. of 3-chloro-4-di-n-butylsulfamoylbenzenesulfonyl chloride, m.p. 62°–64° C.

Step C: 3-Chloro-4-Di-n-butylsulfamoylbenzenesulfonamide.—The 3-chloro-4-di-n-butylsulfamoylbenzenesulfonyl chloride (15 g.) is added to an excess of liquid ammonia. When the excess ammonia has evaporated, the solid residue is triturated with dilute hydrochloric acid and then recrystallized from benzene and hexane to afford 13.6 g. of 3-chloro-4-di-n-butylsulfamoylbenzenesulfonamide, m.p. 92°–94° C.

Elemental analysis for $C_{14}H_{23}ClN_2O_4S_2$.—Calc.: C, 43.91; H, 6.05; N, 7.32. Found: C, 44.21; H, 5.92; N, 7.28.

Step D: N-Acetyl-4-Di-n-butylsulfamoyl-3-chlorobenzenesulfonamide.—A suspension of 2.6 g. of sodium hydride (5 g. of a 51.6% suspension in mineral oil) in dry benzene (300 ml.) is stirred while adding 3-chloro-4-di-n-butylsulfamoylbenzenesulfonamide (38.3 g.). The mixture is heated ½ hour on the steam bath. The resulting gelatinous suspension is cooled and then acetyl chloride (10 g.) is added slowly dropwise as frothing allows. The reaction is heated under reflux for 1 hour after which the benzene is removed by distillation. The tacky residue is stirred with a mixture of ether and sodium bicarbonate solution. The aqueous phase is separated and carefully acidified to precipitate the crude product. Recrystallization from ether (300 ml.) and petroleum ether (150 ml.) affords 29.6 g. of N-acetyl-4-di-n-butylsulfamoyl-3-chlorobenzenesulfonamide, m.p. 119°–120° C.

Elemental analysis for $C_{16}H_{25}ClN_2O_5S_2$.—Calc.: C, 45.21; H, 5.93; N, 6.59. Found: C, 45.45; H, 5.85; N, 6.59.

EXAMPLE 2

N-Acetyl-4-Diethylsulfamoylbenzenesulfonamide, Diethylamine Salt

By substituting for the 3-chloro-4-di-n-butylsulfamoylbenzenesulfonamide of Example 1, Step D, an equimolar quantity of 4-diethylsulfamoylbenzenesulfonamide and by following substantially the procedure described therein, there is obtained N-acetyl-4-diethylsulfamoylbenzenesulfonamide which is isolated as its diethylamine salt, m.p. 130°–132.5° C.

Elemental analysis for $C_{16}H_{29}N_3O_5S_2$.—Calc.: C, 47.15; H, 7.17; N, 10.31. Found: C, 46.86; H, 7.23; N, 10.28.

EXAMPLE 3

N-Cyclopentylacetyl-4-Di-n-butylsulfamoyl-3-Chlorobenzenesulfonamide, Diethylamine Salt By substituting for the acetyl chloride of Example 1, Step D, an equimolar quantity of cyclopentylacetyl chloride and by following substantially the procedure described therein, there is obtained N-cyclopentylacetyl-4-di-n-butylsulfamoyl-3-chlorobenzenesulfonamide, which is isolated as its diethylamine salt, m.p. 103°–105° C.

Elemental analysis for $C_{25}H_{44}ClN_3O_5S_2$.—Calc.: C, 53.05; H, 7.83; N, 7.42. Found: C, 52.81; H, 7.47; N, 7.43.

EXAMPLE 4

N-Chloroacetyl-4-Di-n-butylsulfamoyl-3-Chlorobenzenesulfonamide, Diethylamine Salt By substituting for the acetyl chloride of Example 1, Step D, an equimolar quantity of chloroacetyl chloride and by following substantially the procedure described therein, there is obtained N-chloroacetyl-4-di-n-butylsulfamoyl-3-chlorobenzenesulfonamide, isolated as its diethylamine salt, m.p. 122°–124° C.

Elemental analysis for $C_{16}H_{24}Cl_2N_2O_5S_2$.—Calc.: C, 41.83; H, 5.27; N, 6.10. Found: C, 42.33; H, 4.92; N, 5.94.

EXAMPLE 5

N-2′-Furoyl-4-Di-n-butylsulfamoyl-3-Chlorobenzene sulfonamide, Diethylamine Salt By substituting for the acetyl chloride of Example 1, Step D, an equimolar quantity of 2-furoyl chloride and by following substantially the procedure described therein, there is obtained N-2′-furoyl-4-di-n-butylsulfamoyl-3-chlorobenzenesulfonamide, isolated as its diethylamine salt, m.p. 116°–118° C.

Elemental analysis for $C_{23}H_{36}ClN_3O_6S_2$. — Calc.: C, 50.21; H, 6.60; N, 7.64. Found: C, 50.05; H, 6.19; N, 7.64.

EXAMPLE 6

N-Acetyl-4-Di-n-butylsulfamoyl-3-Bromobenzenesulfonamide

Step A: $N^1,N^1$-Di-n-butyl-2-Bromosulfanilamide.—By substituting for the 2-chloro-N-acetylsulfanilyl chloride in Example 1, Step A, an equimolar quantity of 2-bromo-N-acetylsulfanilyl chloride and by following substantially the procedure described therein, there is obtained $N^1,N^1$-di-n-butyl-2-bromosulfanilamide, m.p. 107°–113° C.

Step B: 3-Bromo-4-Di-n-butylsulfamoylbenzenesulfonyl-Chloride.—By substituting $N^1,N^1$-di-n-butyl-2-bromosulfanilamide for the $N^1,N^1$-di-n-butyl-2-chlorosulfanilamide in Example 1, Step B, and by following substantially the procedure described therein, affords 3-bromo-4-di-n-butylsulfamoylbenzenesulfonyl-chloride, m.p. 68°–69° C.

Step C: 3-Bromo-4-Di-n-butylsulfamoylbenzenesulfonamide.—By substituting for the 3-chloro-4-di-n-butylsulfamoylbenzenesulfonyl chloride of Example 1, Step C, an equimolar quantity of 3-bromo-4-di-n-butylsulfamoylbenzenesulfonyl chloride and by following substantially the procedure described therein, there is obtained 3-bromo-4-di-n-butylsulfamoylbenzenesulfonamide, m.p. 122°–124° C.

Elemental analysis for $C_{14}H_{23}BrN_2O_4S_2$.—Calc.: C, 39.34; H, 5.42; N, 6.56. Found: C, 39.76; H, 5.05; N, 6.52.

Step D: N-Acetyl-4-Di-n-butylsulfamoyl-3-Bromobenzenesulfonamide.—By substituting for the 3-chloro-4-di-n-butylsulfamoylbenzenesulfonamide of Example 1, Step D, an equimolar quantity of 3-bromo-4-di-n-butylsulfamoylbenzenesulfonamide and by following substantially the procedure described therein, there is obtained N-acetyl-4-di-n-butylsulfamoyl-3-bromobenzenesulfonamide, m.p. 126°–127° C.

Elemental analysis for $C_{16}H_{25}BrN_2O_5S_2$.—Calc.: C, 40.94; H, 5.37; N, 5.97. Found: C, 40.90; H, 5.15; N, 5.97.

EXAMPLE 7

N-Acetyl-4-Di-n-propylsulfamoyl-3-Chlorobenzenesulfonamide

Step A: $N^1,N^1$-Di-n-propyl - 2 - Chlorosulfanilamide.—By substituting for the di-n-butylamine of Example 1, Step A, an equimolar quantity of di-n-propylamine and by following substantially the procedure described therein, there is obtained $N^1,N^1$-di-n-propyl-2-chlorosulfanilamide, m.p. 153°–155° C.

Step B: 3-Chloro - 4 - Di-n-propylsulfamoylbenzenesulfonyl Chloride.—By substituting for the $N^1,N^1$-di-n-butyl-2-chlorosulfanilamide of Example 1, Step B, an equimolar quantity of $N^1,N^1$-di-n-propyl-2-chlorosulfanilamide and by following substantially the procedure described therein, there is obtained 3-chloro-4-di-n-propylsulfamoylbenzenesulfonyl chloride, m.p. 58°–61° C.

Step C: 3-Chloro - 4 - Di-n-propylsulfamoylbenzenesulfonamide.—By substituting for the 3-chloro-4-di-n-butylsulfamoylbenzensulfonyl chloride of Example 1, Step C, an equimolar quantity of 3-chloro-4-di-n-propylsulfamoylbenzenesulfonyl chloride and by following slubstantially the procedure described therein, there is obtained 3 - chloro-4-di-n-propylsulfamoylbenzenesulfonamide, m.p. 93°–95° C.

Elemental analysis for $C_{12}H_{19}ClN_2O_4S_2$.—Calc.: C, 40.61; H, 5.40; N, 7.90. Found: C, 40.31; H, 5.28; N, 7.85.

Step D: N-Acetyl - 4 - Di-n-propylsulfamoyl-3-Chlorobenzenesulfonamide.—By substituting for the 3-chloro-4-di-n-butylsulfamoylbenzensulfonamide of Example 1, Step D, an equimolar quantity of 3-chloro-4-di-n-propylsulfamoylbenzenesulfonamide and following substantially the procedure described therein, there is obtained N-acetyl - 4 - di-n-propylsulfamoyl-3-chlorobenzenesulfonamide, m.p. 156°–158° C.

Elemental analysis for $C_{14}H_{21}ClN_2O_5S_2$.—Calc.: C, 42.36; H, 5.33; N, 7.06. Found: C, 42.58; H, 5.32; N, 7.10.

EXAMPLE 8

N-Acetyl-4-Di-n-butylsulfamoyl-3-Chlorobenzenesulfonamide

Step A: 2-Chloro - 4 - Sulfamoylbenzenesulfonyl Chloride.—A suspension of 3-chlorosulfanilamide (20 g.) in acetic acid (90 ml.) and concentrated hydrochloric acid (40 ml.) at 0° C. is converted to the diazonium salt by the addition of a solution of sodium nitrite (7 g.) in water. To a solution of sulfur dioxide (30 g.) in acetic acid (60 ml.) a solution of cupric chloride (5 g.) in water (10 ml.) is added. The diazonium salt solution then is added to the sulfur dioxide solution. After standing several hours, the product is precipitated by the addition of water to yield 16 g. of 2-chloro-4-sulfamoylbenzenesulfonyl chloride, m.p. 126°–129° C.

Step B: 3-Chloro-4 - Di - n - butylsulfamoylbenzenesulfonamide.—A solution of di-n-butylamine (10.4 g.) in acetone (60 ml.) is cooled and stirred while 2-chloro-4-sulfamoylbenzenesulfonyl chloride (10 g.) is added. The reaction is warmed on the steam bath for a short period of time and then the solvent is removed. Treatment of the residue with water and a little acid yields 3-chloro-4-di-n-butylsulfamoylbenzenesulfonamide, m.p. 92°–94° C.

Step C: N-Acetyl-4-Di-n-butylsulfamoyl-3-Chlorobenzenesulfonamide.—By following the procedure as described in Example 1, Step D, there is obtained N-acetyl-4-di-n-butylsulfamoyl-3 - chlorobenzenesulfonamide, m.p. 119°–120° C.

EXAMPLE 9

N-Acetyl-4-Dipentylsulfamoyl-3-Chlorobenzenesulfonamide

Step A: 3-Chloro-4-Dipentylsulfamoylbenzenesulfonamide.—By substituting for the di-n-butylamine of Example 8, Step B, an equimolar quantity of dipentylamine and by following substantially the procedure described therein, there is obtained 3-chloro-4-dipentylsulfamoylbenzenesulfonamide.

Step B: N-Acetyl-4-Dipentylsulfamoyl-3-Chlorobenzenesulfonamide.—By substituting for the 3-chloro-4-di-n-butylsulfamoylbenzenesulfonamide of Example 1, Step D, an equimolar quantity of 3-chloro-4-dipentylsulfamoylbenzenesulfonamide and by following substantially the procedure described therein, there is obtained N-acetyl-4-dipentylsulfamoyl-3-chlorobenzenesulfonamide, m.p. 97°–99° C.

Elemental analysis for $C_{18}H_{29}ClN_2O_5S_2$.—Calc.: C, 47.72; H, 6.45; N, 6.19. Found: C, 47.66; H, 6.27; N, 6.26.

EXAMPLE 10

N-Acetyl-4-Hexylsulfamoyl-3-Chlorobenzenesulfonamide

Step A: 3-Chloro - 4 - Hexylsulfamoylbenzenesulfonamide.—By substituting for the di-n-butylamine of Example 8, Step B, an equimolar quantity of monohexylamine and by following substantially the procedure described therein, there is obtained 3-chloro-4-hexylsulfamoylbenzenesulfonamide, m.p. 145°–148° C.

Step B: N-Acetyl-4-Hexylsulfamoyl-3-Chlorobenzenesulfonamide.—By substituting for the 3-chloro-4-di-n-butylsulfamoylbenzenesulfonamide of Example 1, Step D, an equimolar quantity of 3-chloro-4-hexylsulfamoylbenzenesulfonamide and by following substantially the procedure described therein, there is obtained N-acetyl-4-hexylsulfamoyl-3-chlorobenzenesulfonamide, m.p. 111°–113° C.

Elemental analysis for $C_{14}H_{21}ClN_2O_5S_2$.—Calc.: C, 42.36; H, 5.33; N, 7.06. Found: C, 42.62; H, 5.36; N, 7.29.

EXAMPLE 11

N-Acetyl-4-Di-n-butylsulfamoyl-3-Methylbenzenesulfonamide, Diethylamine Salt Step A: 2-Methyl-4-Sulfamoylbenzenesulfonyl Chloride.—By substituting in Example 8, Step A, for the 3-chlorosulfanilamide recited therein an equimolar quantity of 3-methylsulfanilamide and by following substantially the procedure described therein, there is obtained 2-methyl-4-sulfamoylbenzenesulfonyl chloride.

Step B: 3-Methyl-4-Di-n-butylsulfamoylbenzenesulfonamide.—By substituting for the 2-chloro-4-sulfamoylbenzenesulfonyl chloride of Example 8, Step B, an equimolar quantity of 2-methyl-4-sulfamoylbenzenesulfonyl chloride and by following substantially the procedure described therein, there is obtained 3-methyl-4-di-n-butylsulfamoylbenzenesulfonamide.

Step C: N-Acetyl-4-Di-n-butylsulfamoyl - 3 - Methylbenzenesulfonamide, Diethylamine Salt.—By substituting for the 3 - chloro - 4 - di-n-butylsulfamoylbenzenesulfonamide of Example 1, Step D, an equimolar quantity of 3-methyl-4-di-n-butylsulfamoylbenzenesulfonamide and by following substantially the procedure described therein, there is obtained N-acetyl-4-di-n-butylsulfamoyl-3-methylbenzenesulfonamide, which is isolated as its diethylamine salt, m.p. 120°–122° C.

Elemental analysis for $C_{21}H_{39}N_3O_5S_2$.—Calc.: C, 52.80; H, 8.23; N, 8.80. Found: C, 53.05; H, 8.16; N, 9.01.

EXAMPLE 12

N-Acetyl-4-Di-n-butylsulfamoyl-3-Chlorobenzenesulfonamide

3-Chloro-4-di-n-butylsulfamoylbenzenesulfonamide (5.7 g.) is suspended in acetic anhydride (10 ml.). To this is added 2 drops of concentrated sulfuric acid. The reaction mixture becomes warm and is heated for 1 hour on the steam bath. The reaction mixture then is cooled, added to ice water (50 ml.) and stirred until the product is solid. After air drying, the product is recrystallized from ether and petroleum ether to yield N-acetyl-4-di-n-butylsulfamoyl-3-chlorobenzenesulfonamide, m.p. 119°–120- C.

EXAMPLE 13

N-Propionyl-3-Chloro-4-Di-n-butylsulfamoylbenzene sulfonamide

3-Chloro-4-di-n-butylsulfamoylbenzenesulfonamide (7.6 g.) is dissolved in n-propionyl chloride (5 g.) and heated under reflux for ½ hour on the steam bath. The excess propionyl chloride is removed under reduced pressure and the residual oil is treated with aqueous sodium bicarbonate. The aqueous mixture is extracted with ether to remove some impurity and then carefully acidified to precipitate the product. Recrystallization from ether-petroleum ether yields 5.1 g. of N-propionyl-3-chloro-4-di-n-butylsulfamoylbenzenesulfonamide, m.p. 86°–88° C.

Elemental analysis for $C_{17}H_{27}ClN_2O_5S_2$.—Calc.: C, 46.51; H, 6.20; N, 6.38. Found: C, 46.40; H, 5.91; N, 6.51.

EXAMPLE 14

N-n-Butyryl-3-Chloro-4-Di-n-butylsulfamoylbenzene-sulfonamide

By substituting n-butyryl chloride (6.5 g.) for the n-propionyl chloride in Example 13, and by following the procedure described therein, there is obtained 3.9 g. of N-n-butyryl-3 - chloro-4 - di-n-butylsulfamoylbenzenesulfonamide, m.p. 78°–80° C.

Elemental analysis for $C_{18}H_{29}ClN_2O_5S_2$.—Calc.: C, 47.22; H, 6.45; N, 6.18. Found: C, 47.76; H, 6.33; N, 6.18.

EXAMPLE 15

N-Acetyl-4-Di-n-butylsulfamoylbenzenesulfonamide

Step A: 4-Di-n-butylsulfamoylbenzenesulfonamide.—4-Sulfamoylbenzenesulfonyl chloride 10 g.) is added slowly in portions to a cooled solution of di-n-butylamine (10 g.) in acetone (50 ml.) with stirring. The mixture is warmed on the steam bath after which the solvent is removed under reduced pressure. Water is added to the residual oil and the mixture is acidified to afford the solid crude product. Recrystallization from benzene and hexane yields 12.4 g. of 4 - di-n-butylsulfamoylbenzenesulfonamide, m.p. 133°–134° C.

Elemental analysis for $C_{14}H_{26}N_2O_4S_2$.—Calc.: C, 48.25; H, 6.94; N, 8.04. Found: C, 48.08; H, 6.61; N, 8.07.

Step B: N-Acetyl-4-Di-n-butylsulfamoylbenzene-sulfonamide.—By substituting 4-di-n-butylsulfamoylbenzenesulfonamide for the 3-chloro-4 - di-n-butylsulfamoylbenzenesulfonamide of Example 1, Step D, and by following substantially the procedure described therein, there is obtained N-acetyl-4 - di-n-butylsulfamoylbenzenesulfonamide which displays a dual melting point, melting at 102°–104° C. and then resolidifying and remelting at 106°–107° C.

Elemental analysis for $C_{16}H_{26}N_2O_5S_2$.—Calc.: C, 49.21; H, 6.71; N, 7.17. Found: C, 49.30; H, 6.43; N, 6.93.

EXAMPLE 16

N-Trichloroacetyl-4-Di-n-propylsulfamoylbenzene-sulfonamide

By substituting an equimolar quantity of 4-di-n-propylsulfamoylbenzenesulfonamide and trichloroacetyl chloride for the 3-chloro-4-di-n-butylsulfamoylbenzenesulfonamide and acetyl chloride of Example 1, Step D, and by following substantially the procedure described therein, there is obtained N - trichloroacetyl - 4 - di-n-propylsulfamoylbenzenesulfonamide, m.p. 136°–138° C.

Elemental analysis for $C_{14}H_{19}Cl_3N_2O_5S_2$.—Calc.: C, 36.10; H, 4.11; N, 6.02. Found.: C, 36.47; H, 4.16; N, 6.02.

EXAMPLE 17

N-Trichloroacetyl-4-Di-n-butylsulfamoylbenzene-sulfonamdie

By substituting an equimolar quantity of 4-di-n-butyl-sulfamoylbenzenesulfonamide and trichloroacetyl chloride for the 3-chloro-4-di-n-butylsulfamoylbenzenesulfonamide and acetyl chloride of Example 1, Step D, and by following substantially the procedure described therein, there is obtained N-trichloroacetyl-4 - di-n-butylsulfamoylbenzene-sulfonamide, m.p. 110°–111° C.

Elemental analysis for $C_{16}H_{23}Cl_3N_2O_5S_2$.—Calc.: C, 38.91; H, 4.69; N, 5.67. Found: C, 38.89; H, 4.45; N, 5.62.

EXAMPLE 18

N-Acetyl-4-Dipentylsulfamoylbenzenesulfonamide, Diethylamine Salt

Step A: 4 - Dipentylsulfamoylbenzenesulfonamide.—By substituting for the di-n-butylamine of Example 15, Step A, an equimolar quantity of dipentylamine and by following substantially the procedure described therein, there is obtained 4 - dipentylsulfamoylbenzenesulfonamide, m.p. 133°–135° C.

Elemental analysis for $C_{15}H_{24}N_2O_4S_2$.—Calc.: C, 51.03; H, 7.50; N, 7.44. Found: C, 51.59; H, 7.25; N, 7.58.

Step B: N-Acetyl-4 - Diphentylsulfamoylbenzenesulfonamide, Diethylamine Salt.—By substituting for the 3-chloro - 4 - di-n-butylsulfamoyl-benzenesulfonamide of Example 1, Step D, an equimolar quantity of 4-dipentylsulfamoylbenzenesulfonamide and by following substantially the procedure described therein, there is obtained N-acetyl-4-dipentylsulfamoylbenzenesulfonamide, which is isolated as its diethylamine salt, m.p. 74°–76° C.

Elemental analysis for $C_{22}H_{41}N_3O_5S_2$.—Calc.: C, 53.74; H, 8.41; N, 8.54. Found: C, 53.65; H, 7.94; N, 8.51.

EXAMPLE 19

N-Acetyl-4-Hexylsulfamoylbenzenesulfonamide

Step A: 4 - Hexylsulfamoylbenzenesulfonamide. — By substituting for the di-n-butylamine of Example 15, Step A, an equimolar quantity of monohexylamine and by following substantially the procedure described therein, there is obtained 4 - hexylsulfamoylbenzenesulfonamide, m.p. 172°–173° C.

Elemental analysis for $C_{12}H_{20}N_2O_4S_2$.—Calc.: C, 44.98; H, 6.29; N, 8.74. Found: C, 45.11; H, 6.06; N, 8.75.

Step B: N - Acetyl - 4 - Hexylsulfamoylbenzenesulfonamide.—By substituting for the 3-chloro-4-di-n-butylsulfamoylbenzenesulfonamide of Example 1, Step D, an equimolar quantity of 4 - hexylsulfamoylbenzenesulfonamide and by following substantially the procedure described therein, there is obtained N-acetyl - 4-hexylsulfamoylbenzenesulfonamide, m.p. 143°–145° C.

Elemental analysis for $C_{14}H_{22}N_2O_5S_2$.—Calc.: C, 46.39; H, 6.12; N, 7.73. Found: C, 46.26; H, 5.89; N, 7.69.

EXAMPLE 20

N-Acetyl-4-Di-n-butylsulfamoyl-3-Trifluoromethylbenzenesulfonamide

Step A: N,N-Di-n-butyl - 4 - Nitro-2-Trifluoromethyl-benzenesulfonamide.—4 - Nitro - 2 - trifluoromethylbenzenesulfonyl chloride (16.5 g.) is added to di-n-butylamine (16 g.) in acetone (200 ml.) with stirring. The reaction mixture is warmed on a steam bath and then the solvent removed at reduced pressure. To the residue is added water and then the mixture is acidified with dilute hydrochloric acid to afford the solid crude product which is extracted with ether and dried over sodium sulfate. After removal of the drying agent, the solution is concentrated to dryness and the residue recrystallized from petroleum ether to yield 17.7 g. of N,N-di-n-butyl-4-nitro-2-trifluoro-methylbenzenesulfonamide, m.p. 50°–51° C.

Elemental analysis for $C_{15}H_{21}F_3N_2O_4S$.—Calc.: C, 47.11; H, 5.54; N, 7.33. Found: C, 48.01; H, 5.46; N, 7.29.

Step B: $N^1,N^1$-Di-n-butyl - 2 - Trifluoromethylsulfanilamide.—To a suspension of iron powder (25 g.) in water (500 ml.) and acetic acid (25 ml.) warmed to 70° C. is added with good stirring N,N-di-n-butyl - 4 - nitro-2-tri-fluoromethylbenzenesulfonamide (15 g.) in about 5 equal portions at such a rate as the foaming allows. After the addition, heating at 70°–80° C. and good stirring is continued for 1½ hours. The reaction mixture is cooled and extracted with ether by decantation (4× 300 ml.). On removal of the ether and recrystallization of the residue from ether-petroleum ether there is obtained 12.3 g. of $N^1,N^1$-di-n-butyl - 2 - trifluoromethylsulfanilamide, m.p. 135°–136° C.

Elemental analysis for $C_{15}H_{23}F_3N_2O_2S$.—Calc.: C, 51.12; H, 6.58; N, 7.95. Found: C, 51.64; H, 6.38; N, 7.93.

Step C: 4-Di-n-butylsulfamoyl - 3 - Trifluoromethylbenzenesulfonyl Chloride.—By substituting for the $N^1,N^1$-di-n-butyl - 2 - chlorosulfanilamide of Example 1, Step B, an equimolar quantity of $N^1,N^1$-di-n-butyl - 2 - trifluoromethylsulfanilamide and by following substantially the procedure described therein, there is obtained 4-di-n-butylsulfamoyl - 3 - trifluoromethylbenzenesulfonyl chloride, m.p. 71°–72° C.

Step D: 4-Di-n-butylsulfamoyl - 3 - Trifluoromethylbenzenesulfonamide.—By following substantially the procedure as described in Example 1, Step C, and by substituting for the 3-chloro - 4 - di-n-butylsulfamoylbenzenesulfonyl chloride an equimolar quantity of 4-di-n-butylsulfamoyl - 3 - trifluoromethylbenzenesulfonyl chloride, there is obtained 4-di-n-butylsulfamoyl - 3 - trifluoromethylbenzenesulfonamide, m.p. 116°–117° C.

Elemental analysis for $C_{15}H_{23}F_3N_2O_4S$.—Calc.: C, 43.26; H, 5.56; N, 6.73. Found: C, 43.15; H, 5.07; N, 6.71.

Step E: N-Acetyl - 4 - Di-n-butylsulfamoyl -3 - Trifluoromethylbenzenesulfonamide.—By following substantially the procedure described in Example 1, Step D, and by substituting for the 3-chloro - 4 - di-n-butylsulfamoyl benzenesulfonamide an equimolar quantity of 4-di-n-butylsulfamoyl-3-trifluoromethylbenzenesulfonamide, there is obtained N-acetyl - 4 - di-n-butylsulfamoyl-3-trifluoromethylbenzenesulfonamide, m.p. 118°–120° C.

Elemental analysis for $C_{17}H_{25}F_3N_2O_5S_2$.—Calc.: C, 44.53; H, 5.50; N, 6.11. Found: C, 44.78; H, 5.56; N, 6.08.

EXAMPLE 21

N-Acetyl-4-Di-n-butylsulfamoyl-3-Fluorobenzenesulfonamide

Step A: $N^4$-Acetyl - $N^1,N^1$ - Di-n-butyl - 2 - Fluorosulfanilamide.—m - Fluoroacetanilide (153) is added to chlorosulfonic acid (330 ml.). After heating at 60°–65° C. for 2 hours the solution is cooled and poured onto crushed ice to yield 56 g. of crude 2-fluoro-N-acetylsulfanilyl chloride which is added to di-n-butylamine (75 g.) in benzene (200 ml.). After heating on the steam bath ½ hour the reaction is cooled and washed with a mixture of water (200 ml.) and concentrated hydrochloric acid (100 ml.). After drying the organic phase over sodium sulfate the drying agent is removed and the solvent removed at reduced pressure to yield 41 g. of crude product, $N^4$-acetyl - $N^1,N^1$ - di-n-butyl - 2 - fluorosulfanilamide, m.p. 70°–72° C. Recrystallization from ether yields $N^4$-acetyl - $N^1,N^1$ - di-n-butyl - 2 - fluorosulfanilamide, m.p. 72°–74° C.

Elemental analysis for $C_{16}H_{25}FN_2O_3S$.—Calc.: C, 55.79; H, 7.32; N, 8.13. Found: C, 56.30; H, 7.02; N, 8.19.

Step B: $N^1,N^1$-Di-n-butyl - 2 - Fluorosulfanilamide.—$N^4$-Acetyl - $N^1,N^1$ - di-n-butyl - 2 - fluorosulfanilamide (40 g.) in hydrochloric acid (150 ml., 6 N) and ethanol (200 ml.) is heated on the steam bath for 3 hours. The reaction mixture is cooled and made basic with a 40% solution of sodium hydroxide to yield 29.5 g. of $N^1,N^1$-di-n-butyl-2-fluorosulfanilamide.

Step C. 4-Di-n-butylsulfamoyl - 3 - Fluorobenzenesulfonyl Chloride.—By following substantially the procedure as described in Example 1, Step B, and by substituting for the $N^1,N^1$-di-n-butyl - 2 - chlorosulfanilamide recited therein, an equimolar quantity of $N^1,N^1$ - di-n-butyl-2-chlorosulfanilamide recited therein, an equimolar quantity of $N^1,N^1$-di-n-butyl - 2 - fluorosulfanilamide, there is obtained 4-di-n-butylsulfamoyl - 3 - fluorobenzenesulfonyl chloride, m.p. 107°–109° C.

Step D: 4-Di-n-butylsulfamoyl - 3 - Fluorobenzenesulfonamide.—By following substantially the procedure as described in Example 1, Step C, and by substituting for the 3 - chloro - 4 - di-n-butylsulfamoylbenzenesulfonyl chloride, there is obtained 4-di-n-butylsulfamoyl-3-fluorochloride an equimolar quantity of 4-di-n-butylsulfamoyl-3 - fluorobenzenesulfonylbenzenesulfonamide, m.p. 93°–95° C.

Elemental analysis for $C_{14}H_{23}FN_2O_4S_2$.—Calc.: C, 45.88; H, 6.33; N, 7.65. Found: C, 45.26; H, 6.22; N, 7.65.

Step E: N-Acetyl - 4 - Di-n-butylsulfamoyl - 3 - Fluorobenzenesulfonamide.—By following substantially the procedure as described in Example 1, Step D, and by substituting for the 3 - chloro - 4 - di-n-butylsulfamoylbenzenesulfonamide an equimolar quantity of 4-di-n-butylsulfamoyl - 4 - fluorobenzenesulfonamide, there is obtained N-acetyl - 4 - di-n-butylsulfamoyl-3-fluorobenzenesulfonamide, m.p. 73°–75° C.

Elemental analysis for $C_{16}H_{25}FN_2O_5S_2$.—Calc.: C, 47.04; H, 6.17; N, 6.86. Found: C, 47.41; H, 5.87; N, 6.88.

EXAMPLE 22

N-Acetyl-4-Di-n-butylsulfamoylbenzenesulfonamide

Step A: $N^1,N^1$-Di-n-butylsulfanilamide.—To a chilled solution of di-n-butylamine (70 g.) in pyridine (150 ml.) is added acetylsulfanilyl chloride (60 g.) in portions and with good stirring. After the addition is complete, the reaction mixture is warmed on the steam bath for 3 hours. The excess pyridine and dibutyl amine are removed under reduced pressure to yield crude $N^4$-acetyl-$N^1,N^1$-di-n-butylsulfanilamide as a thick brown oil. A mixture of ethanol (150 ml.), water (250 ml.) and concentrated hydrochloric acid (250 ml.) is added and the reaction mixture heated on the steam bath for 3 hours. The excess ethanol is removed, the reaction mixture cooled and a 40% solution of sodium hydroxide is added until the reaction mixture is basic. The oil that separates soon crystallizes. Recrystallization from etherhexane yields 57.8 g. of $N^1,N^1$-di-n-butylsulfanilamide, m.p. 71°–73° C.

Elemental analysis for $C_{14}H_{24}N_2O_2S$.—Calc.: C, 59.12; H, 8.50; N, 9.85. Found: C, 59.09; H, 8.35; N, 9.74.

Step B: 4-Di-n-butylsulfamoylbenzenesulfonyl Chloride.—$N^1,N^1$-di-n-butylsulfanilamide (0.2 mole) in acetic acid (200 ml.) and concentrated hydrochloric acid (150 ml.) is diazotized at 0° C. with sodium nitrite (14.1 g.) and added carefully to a solution of sulfur dioxide (100 g.) in acetic acid (200 ml.) containing cupric chloride (14 g.). After 2 hours the reaction mixture is filtered to obtain, after drying, 69.5 g. of crude 4-di-n-butylsulfamoylbenzenesulfonyl chloride. Recrystallization from benzene yields 4-di-n-butylsulfamoylbenzenesulfonyl chloride, m.p. 124°–126° C.

Elemental analysis for $C_{14}H_{22}ClNO_4S_2$.—Calc.: C, 45.72; H, 6.03; N, 3.81. Found: C, 45.88; H, 6.15; N, 3.79.

Step C: 4-Di-n-butylsulfamoylbenzenesulfonamide.—By following substantially the procedure as described in Example 1, Step C, and by substituting for the 3-chloro-4 - di - n - butylsulfamoylbenzenesulfonyl chloride recited therein an equimolar quantity of 4-di-n-butylsulfamoylbenzenesulfonyl chloride, there is obtained 4-di-n-butylsulfamoylbenzenesulfonamide, m.p. 133°–134° C.

Step D: N-Acetyl-4-Di-n-butylsulfamoylbenzenesulfonamide.—By following substantially the procedure as described in Example 12 and by substituting for the 3-chloro - 4-di-n-butylsulfamoylbenzenesulfonamide recited therein an equimolar quantity of 4-di-n-butylsulfamoylbenzenesulfonamide, there is obtained N-acetyl-4-di-n-butylsulfamoylbenzenesulfonamide, m.p. 106°–107° C.

EXAMPLE 23

N-Acetyl-4-Di-n-propylsulfamoylbenzenesulfonamide

Step A: $N^1,N_1$-Di-n-propylsulfanilamide.—By substituting for the di-n-butylamine of Example 22, Step A, an equimolar quantity of di-n-propylamine and by following substantially the procedure described therein, there is obtained $N^1,N^1$-di-n-propylsulfanilamide, m.p. 120°–122° C.

Step B: 4-Di-n-propylsulfamoylbenzenesulfonyl Chloride.—By substituting for the $N^1,N^1$-di-n-butylsulfanilamide of Example 22, Step B, an equimolar quantity of $N^1,N^1$-di-n-propylsulfanilamide and by following substantially the procedure described therein, there is obtained 4-di-n-propylsulfamoylbenzenesulfonyl chloride, m.p. 125°–127° C.

Step C: 4-Di-n-propylsulfamoylbenzenesulfonamide.—By substituting for the 3-chloro-4-di-n-butylsulfamoylbenzenesulfonyl chloride of Example 1, Step C, an equimolar quantity of 4-di-n-propylsulfamoylbenzenesulfonyl chloride and by following substantially the procedure described therein, there is obtained 4-di-n-propylsulfamoylbenzenesulfonamide, m.p. 125°–127° C.

Elemental analysis for $C_{12}H_{20}N_2O_4S_2$.—Calc.: C, 44.98; H, 6.29; N, 8.74. Found: C, 45.19; H, 6.43; N, 8.81.

Step D: N-Acetyl-4-Di-n-propylsulfamoylbenzenesulfonamide.—By substituting for the 3-chloro-4-di-n-butylsulfamoylbenzenesulfonamide of Example 12, an equimolar quantity of 4-di-n-propylsulfamoylbenzenesulfonamide and by following substantially the procedure described therein, there is obtained N-acetyl-4-di-n-propylsulfamoylbenzenesulfonamide, m.p. 119°–120° C.

Elemental analysis for $C_{14}H_{22}N_2O_5S_2$.—Calc.: C, 46.39; H, 6.12; N, 7.73. Found: C, 46.49; H, 5.95; N, 7.69.

EXAMPLE 24

N-Acetyl-2-Chloro-4-Di-n-propylsulfamoylbenzenesulfonamide

Step A: 3-Chloro-4-Sulfamoylbenzenesulfonyl Chloride.—By substituting for the 3-chlorosulfanilamide of Example 8, Step A, an equimolar quantity of 2-chlorosulfanilamide and by following substantially the procedure described therein, there is obtained 3-chloro-4-sulfamoylbenzenesulfonyl chloride, m.p. 158°–161° C.

Step B: 2-Chloro-4-Di-n-propylsulfamoylbenzenesulfonamide.—To a solution of dry di-n-propylamine (15 g.) in dry benzene is added 3-chloro-4-sulfamoylbenzenesulfonyl chloride (14.5 g.). The reaction mixture is warmed on the steam bath for 1 hour to remove most of the solvent. The oily residue is triturated with dilute hydrochloric acid to yield 8.1 g. of 2-chloro-4-di-n-propylsulfamoylbenzenesulfonamide, m.p. 124°–126° C.

Step C: N-Acetyl - 2 - Chloro-4-Di-n-propylsulfamoylbenzenesulfonamide.—By substituting for the 3-chloro-4-di-n-butylsulfamoylbenzenesulfonamide of Example 1, Step D, an equal quantity of 2-chloro-4-di-n-propylsulfamoylbenzenesulfonamide and by following substantially the procedure described therein, there is obtained N-acetyl-2-chloro-4 - di-n-propylsulfamoylbenzenesulfonamide, m.p. 165°–167° C.

Elemental analysis for $C_{14}H_{21}ClN_2O_5S_2$:—Calc.: C, 42.36; H, 5.33; N, 7.06. Found: C, 42.71; H, 5.20; N, 7.00.

EXAMPLE 25

N-Acetyl-2-Chloro-4-Di-n-butylsulfamoylbenzenesulfonamide

Step A: 2-Chloro-4-Di-n-butylsulfamoylbenzenesulfonamide.—By substituting for the di-n-propylamine of Example 24, Step B, an equimolar quantity of di-n-butylamine and by following substantially the procedure described therein, there is obtained 2-chloro-4-di-n-butylsulfamoylbenzenesulfonamide, m.p. 86°–87° C.

Elemental analysis for $C_{14}H_{23}ClN_2O_4S_2$.—Calc.: C, 43.91; H, 6.05; N, 7.32. Found: C, 44.13; H, 5.88; N, 7.33.

Step B: N-Acetyl - 2 - Chloro-4-Di-n-butylsulfamoylbenzenesulfonamide.—By substituting for the 3-chloro-4-di-n-butylsulfamoylbenzenesulfonamide of Example 1, Step D, an equimolar quantity of 2-chloro-4-di-n-butylsulfamoylbenzenesulfonamide and by following substantially the procedure described therein, there is obtained N-acetyl-2-chloro-4-di-n-butylsulfamoylbenzenesulfonamide, m.p. 133°–134° C.

Elemental analysis for $C_{16}H_{25}ClN_2O_5S_2$.—Calc.: C, 45.21; H, 5.93; N, 6.59. Found: C, 45.35; H, 5.50; N, 6.40.

EXAMPLE 26

N-Acetyl-4-Di-n-butylsulfamoyl-2-Trifluoromethylbenzenesulfonamide

Step A: 4-Sulfamoyl-3-Trifluoromethylbenzenesulfonyl Chloride.—By substituting for the 3-chlorosulfanilamide of Example 8, Step A, an equimolar quantity of 2-trifluoromethylsulfanilamide and by following substantially the procedure described therein, there is obtained 4-sulfamoyl-3-trifluoromethylbenzenesulfonyl chloride, m.p. 152°–154° C.

Step B: 4 - Di-n-butylsulfamoyl-2-Trifluoromethylbenzenesulfonamide.—By substituting for the 2-chloro-4-sulfamoylbenzenesulfonyl chloride of Example 8, Step B, an equimolar quantity of 4-sulfamoyl-2-trifluoromethylbenzenesulfonyl chloride and by following substantially the procedure described therein, there is obtained 4-di-n-butylsulfamoyl - 2 - trifluoromethylbenzenesulfonamide, m.p. 134°–135° C.

Step C: N-Acetyl - 4-Di-n-butylsulfamoyl-2-Trifluoromethylbenzenesulfonamide.—By substituting for the 3-chloro-4-di-n-butylsulfamoylbenzenesulfonamide of Example 1 an equimolar quantity of 4-di-n-butylsulfamoyl-2-trifluoromethylbenzenesulfonamide and by following substantially the proecdure described therein, there is obtained N-acetyl-4-di-n-butylsulfamoyl-2-trifluoromethylbenzenesulfonamide, m.p. 144°–145° C.

Elemental analysis for $C_{17}H_{25}F_3N_2O_5S_2$.—Calc:. C, 44.53; H, 5.50; N, 6.11. Found: C, 44.78; H, 5.31; N, 6.09.

EXAMPLE 27

N-Acetyl-4-Chloro-3-Di-n-propylsulfamoylbenzenesulfonamide

Step A: 2 - Chloro-5-Sulfamoylbenzenesulfonyl Chloride.—By substituting for the 3-chlorosulfanilamide of Example 8, Step A, an equimolar quantity of 4-chlorometanilamide and by following substantially the procedure described therein, there is obtained 2-chloro-5-sulfamoylbenzenesulfonyl chloride, m.p. 185°–187° C.

Step B: 4-Chloro-3-Di-n-propylsulfamoylbenzenesulfonamide.—By substituting for the 3-chloro-4-sulfamoylbenzenesulfonyl chloride of Example 24, Step B, an equimolar quantity of 2-chloro-5-sulfamoylbenzenesulfonyl chloride and by following substantially the procedure described therein, there is obtained 4-chloro-3-di-n-propylsulfamoylbenzenesulfonamide, m.p. 115°–117° C.

Step C: N-Acetyl-4-Chloro-3-Di-n-propylsulfamoylbenzenesulfonamide.—A solution of 4-chloro-3-di-n-propylsulfamoylbenzenesulfonamide (5.3 g.) in dry pyridine (15 ml.) is cooled to 15° C. Acetyl chloride (1.2 g.) is added and the reaction mixture is stirred at room temperature for 2 hours after which it is poured into dilute hydrochloric acid. An oil separates and soon solidifies. Recrystallization from diethyl ether yields 3.7 g. of N-acetyl-4-chloro - 3 - di-n-propylsulfamoylbenznesulfonamide, m.p. 131°–133° C.

Elemental analysis for $C_{14}H_{21}ClN_2O_5S_2$.—Calc.: C, 42.36; H, 5.33; N, 7.06. Found: C, 42.93; H, 5.55; N, 7.03.

EXAMPLE 28

N-Acetyl-4-Chloro-3-Di-n-butylsulfamoylbenzenesulfonamide

Step A: 4-Chloro-3-Di-n-butylsulfamoylbenzenesulfonamide.—By substituting for the 3-chloro-4-sulfamoylbenzenesulfonyl chloride and di-n-propylamine in Example 24, Step B, an equimolar quantity of 2-chloro-5-sulfamoylbenzenesulfonyl chloride and di-n-butylamine and by following substantially the procedure described therein, there is obtained 4-chloro-3-di-n-butylsulfamoylbenzenesulfonamide, m.p. 74°–76° C.

Elemental analysis for $C_{14}H_{23}ClN_2O_4S_2$.—Calc.: C, 43.91; H, 6.05; N, 7.32. Found: C, 44.34; H, 6.02; N, 7.45.

Step B: N-Acetyl-4 - Chloro-3-Di-n-butylsulfamoylbenzenesulfonamide.—By substituting for the 4-chloro-3-di-n-propylsulfamoylbenzenesulfonamide of Example 27, Step C, an equimolar quantity of 4-chloro-3-di-n-butylsulfamoylbenzenesulfonamide and by following substantially the procedure described therein, there is obtained N-acetyl - 4 - chloro-3-di-n-butylsulfamoylbenzenesulfonamide, m.p. 144°–146° C.

Elemental analysis for $C_{16}H_{25}ClN_2O_5S_2$.—Calc.: C, 45.21; H, 5.93; N, 6.59. Found: C, 45.57; H, 5.92; N, 6.36.

EXAMPLE 29

N-Acetyl-3-Di-n-propylsulfamoylbenzenesulfonamide

Step A: 3 - Sulfamoylbenzenesulfonyl Chloride.—By substituting for the 4-chlorometanilamide of Example 27, Step A, an equimolar quantity of metanilamide and by following substantially the procedure described therein, there is obtained 3-sulfamoylbenzenesulfonyl chloride.

Step B: 3-Di-n-propylsulfamoylbenzenesulfonamide.—By substituting for the 2-chloro-5-sulfamoylbenzenesulfonyl chloride of Example 27, Step B, an equimolar quantity of 3-sulfamoylbenzenesulfonyl chloride and by following substantially the procedure described therein, there is obtained 3 - di-n-propylsulfamoylbenzenesulfonamide, m.p. 115°–117° C.

Elemental analysis for $C_{12}H_{10}N_2O_4S_2$.—Calc.: C, 44.98; H, 6.29; N, 8.74. Found: C, 44.88; H, 5.96; N, 8.71.

Step C: N-Acetyl-3-Di-n-propylsulfamoylbenzenesulfonamide.—By substituting for the 4-chloro-3-di-n-propylsulfamoylbenzenesulfonamide of Example 27, Step C, an equimolar quantity of 3-di-n-propylsulfamoylbenzenesulfonamide and by following substantially the procedure described therein, there is obtained N-acetyl-3-di-n-propylsulfamoylbenzenesulfonamide, m.p. 104°–106° C.

Elemental analysis for $C_{14}H_{25}N_2O_5S_2$.—Calc.: C, 46.39; H, 6.12; N, 7.73. Found: C, 46.77; H, 6.09; N, 7.63.

EXAMPLE 30

N-Acetyl-4-Di-n-butylsulfamoylbenzenesulfonamide

Step A: Sodium Acetamide.—To a stirred solution of acetamide (4.1 g., 0.07 mole) in liquid ammonia (150 ml.) is added sodium (1.6 g., 0.07 g. atom) in small portions. A blue color develops immediately after each addition which slowly fades to be replaced by a white precipitate. After all the sodium had been added, the excess ammonia is allowed to evaporate under a stream of dry nitrogen to yield sodium acetamide.

Step B: N-acetyl-4-Di-n-butylsulfamoylbenzenesulfonamide.—The sodium acetamide is suspended in toluene (100 ml.) that had previously been dried over sodium. While this suspension is being stirred, a solution of 4-di-n-butylsulfamoylbenzenesulfonyl chloride, as prepared in Example 22, Step B, in dry toluene (300 ml.) is added and the mixture heated for ½ hour on the steam bath. The reaction mixture is cooled and extracted with an aqueous solution of sodium bicarbonate. The aqueous phase is acidified to obtain N-acetyl-4-di-n-butylfamoyl-benzenesulfonamide, m.p. 106°–107° C.

EXAMPLE 31

N-Acetyl-4-Di-n-butylsulfamoylnaphthalene-1-Sulfonamide

Step A: 4-Sulfamoylnaphthalene - 1 - Sulfonyl Chloride.—By substituting for the 3-chlorosulfanilamide of Example 8, Step A, an equimolar quantity of 1-aminonaphthalene-4-sulfonamide and by following substantially the procedure described therein, there is obtained 4-sulfamoylnaphthalene-1-sulfonyl chloride, m.p. 181°–183° C.

Step B: 4-Di-n-butylsulfamoylnaphthalene - 1 - Sulfonamide.—The 4-sulfamoylnaphthalene-1-sulfonyl chloride (10 g.) is added to a mixture of di-n-butylamine (50 g.) and acetone (50 ml.) while the reaction mixture is stirred and cooled. The reaction mixture is warmed on the steam bath for ½ hour. Ice water and a 10% sodium hydroxide solution (50 ml.) are added and the excess di-n-butylamine is extracted with ether. Acidification of the aqueous phase yields 4-di-n-butylsulfamoylnaphthalene-1-sulfonamide. Recrystallization from a mixture of benzene and hexane yields substantially pure 4-di-n-butylsulfamoylnaphthalene-1-sulfonamide, m.p. 123°–125° C.

Elemental analysis for $C_{18}H_{26}N_2O_4S_2$.—Calc.: C, 54.24; H, 6.58; N, 7.03. Found: C, 54.40; H, 6.57; N, 7.11.

Step C: N-Acetyl-4-Di-n-butylsulfamoylnaphthalene-1-Sulfonamide.—By substituting for the 3-chloro-4-di-n-butylsulfamoylbenzenesulfonamide of Example 12 an equimolar quantity of 4-di-n-butylsulfamoylnaphthalene-1-sulfonamide and by following substantially the procedure described therein, there is obtained N-acetyl-4-di-n-butylsulfamoylnaphthalene - 1 - sulfonamide, m.p. 192°–194° C.

Elemental analysis for $C_{20}H_{28}N_2O_5S_2$.—Calc.: C, 54.52; H, 6.41; N, 6.36. Found: C, 54.78; H, 6.54; N, 6.47.

EXAMPLE 32

N-Acetyl-4-Di-n-butylsulfamoyl-2-Nitrobenzenesulfonamide

Step A: N,N-Di-n-butyl-4-Chloro-3-Nitrobenzenesulfonamide.—A solution of di-n-butylamine (111 g., 0.86 mole) in acetone (300 ml.) is cooled in an ice bath and stirred while 4-chloro-3-nitrobenzenesulfonyl chloride (112 g., 0.43 mole) is added in several portions. The resultant yellow suspension is stirred for 1 hour and then most of the acetone removed by heating on a steam bath. The reaction mixture is diluted with water (300 ml.) and cooled to yield 132 g. of N,N-di-n-butyl-4-chloro-3-nitrobenzenesulfonamide, m.p. 70°–72° C.

Step B: $N^1,N^1$-Di-n-butyl-3-Nitrosulfanilamide.—A mixture of N,N-di-n-butyl-4-chloro-3-nitrobenzenesulfonamide (90 g.) in 10% (weight per unit volume) ammonia in ethanol is heated in an autoclave at 110° C. for 5 hours. On cooling, the slurry is filtered and the filtrate concentrated to yield $N^1,N^1$-di-n-butyl-3-nitrosulfanilamide. Recrystallization from ether yields 49 g. of substantially pure product, m.p. 86°–88° C.

Step C: 4-Di-n-butylsulfamoyl-2-Nitrobenzenesulfonyl Chloride.—By substituting for the $N^1,N^1$-di-n-butyl-2-chlorosulfanilamide of Example 1, Step B, an equimolar quantity of $N^1,N^1$-di-n-butyl-3-nitrosulfanilamide and by following substantially the procedure described therein, there is obtained 4-di-n-butylsulfamoyl-2-nitrobenzenesulfonyl chloride, m.p. 110°–112° C.

Step D: 4-Di-n-butylsulfamoyl-2-Nitrobenzenesulfonamide.—By substituting for the 3-chloro-4-di-n-butylsulfamoylbenzenesulfonyl chloride of Example 1, Step C, an equimolar quantity of 4-di-n-butylsulfamoyl-2-nitrobenzenesulfonyl chloride and by following substantially the procedure described therein, there is obtained 4-di-n-butylsulfamoyl-2-nitrobeneznesulfonamide, m.p. 100°–101° C.

Step E: N-Acetyl-4-Di-n-butylsulfamoyl-2-Nitrobenzenesulfonamide.—By substituting for the 3-chloro-4-di-n-butylsulfamoylbenzenesulfonamide of Example 12 an equimolar quantity of 4-di-n-butylsulfamoyl-2-nitrobenzenesulfonamide and by following substantially the procedure described therein, there is obtained N-acetyl-4-di-n-butylsulfamoyl-2-nitrobenzenesulfonamide, m.p. 111°–113° C., after recrystallization from ether-petroleum ether.

Elemental analysis for $C_{16}H_{25}N_3O_7S_2$.—Calc.: C, 44.12; H, 5.79; N, 9.65. Found: C, 43.91; H, 5.67; N, 9.56.

EXAMPLE 33

N-Acetyl-4-Di-n-butylsulfamoyl-3-Nitrobenzenesulfonamide

Step A: 4-Sulfamoyl-2-Nitrobenzenesulfonyl Chloride.—A suspension of 3-nitrosulfanilamide (32 g.) in acetic acid (160 ml.) and hydrochloric acid (150 ml.) is cooled to 15° C. and stirred while a solution of sodium nitrite (10.2 g.) in water (20 ml.) is added as rapidly as possible while the temperature was maintained between 15° C. and 20° C. This requires about 10 minutes. Meanwhile, sulfur dioxide (70 g.) is dissolved in acetic acid (150 ml.). A solution of cupric chloride (10 g.) in water (20 ml.) is added to the sulfur dioxide solution after which the diazonium salt is added as rapidly as foaming would allow. After standing for 2 hours, the reaction mixture is diluted to 2 liters with water. After another hour the product is collected and recrystallized from a mixture of ether and petroleum ether to yield 4-sulfamoyl-2-nitrobenzenesulfonyl chloride, m.p. 133°–135° C.

Step B: 4-Di-n-butylsulfamoyl-3-Nitrobenzenesulfonamide.—Di-n-butylamine (20 g.) in acetone (20 ml.) is cooled and stirred while 4-sulfamoyl-2-nitrobenzenesulfonyl chloride (15 g.) is added in several portions. The reaction mixture is heated on the steam bath for 1 hour, cooled, and poured into water (300 ml.). An oily product resulted on acidification. The product is dissolved in ether and extracted into a dilute sodium hydroxide solution (500 ml. of 2%). Acidification of the aqueous phase yields 12.5 g. of crude product. Recrystallization from a mixture of ether and petroleum ether yields 4-di-n-butylsulfamoyl-3-nitrobenzenesulfonamide, m.p. 130–132° C.

Step C: N-Acetyl-4-Di-n-butylsulfamoyl-3-Nitrobenzenesulfonamide.—By substituting for the 3-chloro-4-di-n-butylsulfamoylbenzenesulfonamide of Example 12 an equimolar quantity of 4-di-n-butylsulfamoyl-3-nitrobenzenesulfonamide and by following substantially the procedure described therein, there is obtained N-acetyl-4-di-n-butylsulfamoyl-3-nitrobenzenesulfonamide, m.p. 83°–85° C. after recrystallization from a mixture of ether and petroleum ether.

Elemental analysis for $C_{16}H_{25}N_3O_7S_2$.—Calc.: C, 44.12; H, 5.79; N, 9.65. Found: C, 44.10; H, 5.81; N, 9.69.

EXAMPLE 34

N-Sodium-N-Acetyl-4-Di-n-butylsulfamoyl-3-Chlorobenzenesulfonamide Monohydrate.—To a 500 ml. round-bottomed flask fitted with stirrer under a nitrogen atmosphere was added ethanol (100 ml.) and N-acetyl-4-di-n-butylsulfamoyl-3-chlorobenzenesulfonamide (42.5 g., 0.10 mole). To this clear solution is added a solution of sodium methoxide (5.3 g., 0.098 mole) in ethanol (50 ml.). The reaction mixture is stirred at room temperature for 15 minutes and filtered to remove the insoluble impurities. The filtrate was concentrated under vacuum (at less than 50° C.) to a volume of 43 ml. and diethyl ether (850 ml.) added to precipitate a gummy solid. To this mixture is added water (8.5 ml.) to dissolve the precipitate. The clear solution is seeded and stirred for one hour at room temperature and ½ hour at 0°–5° C. The precipitate is collected, washed with diethyl ether (100 ml.) and dried at 50° C. at reduced pressure to yield 43.0 g. of N-sodium-N-acetyl-4-di-n-butylsulfamoyl-3-chlorobenzenesulfonamide monohydrate.

Elemental analysis for $C_{16}H_{26}O_6N_2S_2ClNa$.—Calc.: C, 41.33; H, 5.64; N, 6.03. Found: C, 41.49; H, 5.79; N, 6.00.

EXAMPLE 35

4-Di-n-propylsulfamoyl-N-Methanesulfonylbenzenesulfonamide

Step A: 4-Di-n-propylsulfamoylbenzenesulfonyl Chloride.—A mixture of $N^1,N^1$-di-n-propylsulfanilamide (30 g.) in acetic acid (100 ml.) and concentrated hydrochloric acid (80 ml.) is cooled to 0° C. in an ice and salt bath and stirred while sodium nitrite (8.4 g.) in water (25 ml.) is added, slowly, dropwise at such a rate that the temperature remains below 5° C. Meanwhile, sulfur dioxide (60 g.) is dissolved in acetic acid (125 ml.). To this is added cupric chloride (8.0 g.) in water (15 ml.). When the diazotization reaction is complete, it is added carefully to the sulfur dioxide solution as rapidly as foaming allows. After standing for 2 hours the product is removed by filtration, washed well with water and air dried. There is obtained 35.3 g. of 4-di-n-propylsulfamoylbenzenesulfonyl chloride, m.p. 125°–127° C. The product could be recrystallized from acetic acid and water raising the melting point to 126°–128° C.

Elemental analysis for $C_{12}H_{18}ClNO_4S$.—Calc.: C, 42.41; H, 5.34; N, 4.12. Found: C, 42.30; H, 5.08; N, 4.07.

Step B: 4-Di-n-propylsulfamoyl-N-Methanesulfonylbenzenesulfonamide.—A solution of methanesulfonamide (4.8 g., 0.05 mole) in dry benzene (100 ml.) is stirred while 2 g. of a 59.8% suspension of sodium hydride in mineral oil is added. The reaction then is heated under reflux and stirred for ½ hour. A solution of 17 g. (0.05 mole) of 4-di-n-propylsulfamoylbenzenesulfonyl chloride in dry benzene (100 ml.) is added. The reaction is heated for 3 hours on the steam bath. About half the solvent is then removed by distillation and a 5% sodium hydroxide solution (150 ml.) and enough diethyl ether to cause the organic phase to separate is added. The aqueous phase is acidified to give 9.1 g. of 4-di-n-propylsulfamoyl-N-methanesulfonylbenzenesulfonamide, m.p. 120°–122° C. It is recrystallized from benzene and hexane without change in melting point.

Elemental analysis for $C_{13}H_{22}N_2O_6S_3$.—Calc.: C, 39.16; H, 5.56; N, 7.03. Found: C, 39.07; H, 5.26; N, 7.00.

EXAMPLE 36

3-Chloro-4-Di-n-propylsulfamoyl-N-Methanesulfonylbenzenesulfonamide

Step A: 3-Chloro-4-Di-n-propylsulfamoylbenzenesulfonyl Chloride.—By substituting 2-chloro-$N^1,N^1$-di-n-propylsulfanilamide for the $N^1,N^1$-di-n-propylsulfanilamide of Step A, Example 35, and by following substantially the procedure described therein, there is obtained 3-chloro-4-di-n-propylsulfamoylbenzenesulfonyl chloride, m.p. 93°–95° C.

Step B: 3-Chloro-4-Di-n-propylsulfamoyl-N-Methanesulfonylbenzenesulfonamide.—By substituting for the 4-di-n-propylsulfamoylbenzenesulfonyl chloride of Example 35, Step B, an equimolar quantity of 3-chloro-4-di-n-propylsulfamoylbenzenesulfonyl chloride there is obtained 3-chloro-4-di-n-propylsulfamoyl-N-methanesulfonylbenzenesulfonamide, m.p. 132°–133° C.

Elemental analysis for $C_{13}H_{21}ClN_2O_6S_3$.—Calc.: C, 39.16; H, 5.56; N, 7.03. Found: C, 39.07; H, 5.27; N, 7.00.

EXAMPLE 37

N,N-Bis(4-Di-n-propylsulfamoylbenzenesulfon)amide

By substituting an equimolar quantity of 4-di-n-propylsulfamoylbenzenesulfonamide for the methane sulfonamide of Example 35, Step B, and by following substantially the procedure described therein, there is obtained N,N-bis(4-di-n-propylsulfamoylbenzenesulfon)amide, m.p. 197°–199° C.

Elemental analysis for $C_{24}H_{37}N_3O_8S_4$.—Calc.: C, 46.21; H, 5.98; N, 6.74. Found: C, 46.22; H, 5.68; H, 6.74.

EXAMPLE 38

3-Trifluoromethyl-4-Di-n-butylsulfamoyl-N-Methanesulfonylbenzenesulfonamide

To a solution of 4-di-n-butylsulfamoyl-3-trifluoromethyl-benzenesulfonamide (0.1 mole) in benzene (100 ml.) and pyridine (10 ml.) at 25° C. is added methanesulfonyl chloride (0.1 mole). The reaction is refluxed for one hour on a steam bath and the solvent removed at reduced pressure to yield 3-trifluoromethyl-4-di-n-butylsulfamoyl-N-Methanesulfonylbenzenesulfonamide.

EXAMPLE 39

3-Chloro-4-Di-n-butylsulfamoyl-N-Methanesulfonyl-benzenesulfonamide

To a solution of 3-chloro-4-di-n-butylsulfamoylbenzenesulfonamide (0.1 mole) in pyridine (100 ml.) is added methanesulfonyl chloride (0.1 mole). The reaction is refluxed for one hour and the solvent removed at reduced pressure to yield 3-chloro-4-di-n-butylsulfamoyl-N-methanesulfonylbenzenesulfonamide.

EXAMPLE 40

3-Trifluoromethyl-4-Di-n-butylsulfamoyl-N-Benzenesulfonylbenzenesulfonamide

4-Di-n-butylsulfamoyl - 3 - trifluoromethylbenzenesulfonamide (0.1 mole) is suspended in benzenesulfonic acid anhydride (50 ml.). To this is added 2 drops of concentrated sulfuric acid. The reaction mixture is heated for one hour on the steam bath. The reaction mixture is cooled and extracted with ether. The ether solution is washed with water and then dried over anhydrous magnesium sulfate. Removal of the ether yields 3-trifluoromethyl-4-di-n-butylsulfamoyl-N-benzenesulfonylbenzenesulfonamide.

EXAMPLE 41

3-Trifluoromethyl-4-Di-n-butylsulfamoyl-N-Methanesulfonylbenzenesulfonamide

4-Di-n-butylsulfamoyl - 3 - trifluoromethylbenzenesulfonamide (0.1 mole) is suspended in methanesulfonic acid anhydride (0.1 mole). Two drops of concentrated sulfuric acid are added and the reaction mixture heated for one hour on the steam bath. The reaction mixture is cooled and extracted with ether. The ether solution is washed with water and dried over anhydrous magnesium sulfate. The ether solution is filtered and the ether removed to yield 3-trifluoromethyl-4-di-n-butylsulfamoyl-N-methanesulfonylbenzenesulfonamide.

In a manner similar to that described in Example 21 for the preparation of N-acetyl-4-di-n-butylsulfamoyl-3-fluorobenzenesulfonamide the N-acyl-mono-substituted or di-substituted sulfamoylbenzenesulfonamides of this invention may be obtained. Thus, by substituting the appropriately substituted acetanilide for the m-fluoroacetanilide of Example 21, Step A, and following substantially the procedure described in Steps A through E of that example, the N-acyl-mono-substituted and di-substituted sulfamoylbenzenesulfonamides of this invention may be obtained. The following equation illustrates the reaction of Example 21, Steps A through E, and, together with Table I, infra, depict the intermediate derivatives and N-acyl-mono-substituted and di-substituted sulfamoylbenzenesulfonamide products obtained thereby:

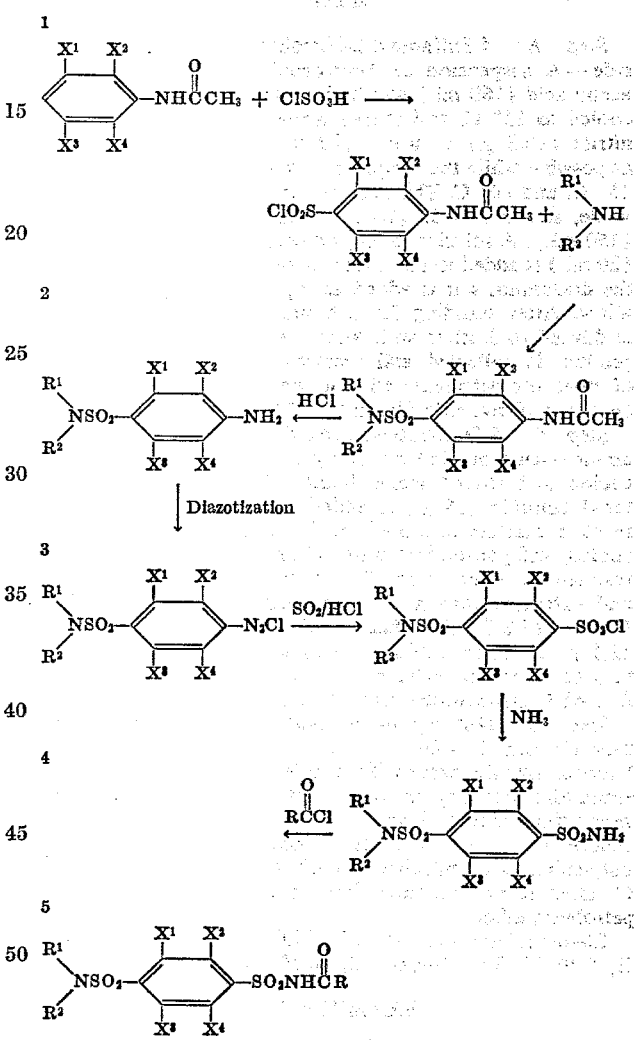

TABLE I

| Example number | R | $R^1$ | $R^2$ | $X^1$ | $X^2$ | $X^3$ | $X^4$ |
|---|---|---|---|---|---|---|---|
| 42 | —H₂C—furan | n-C₄H₉ | n-C₄H₉ | —Cl | —Cl | H | H |
| 43 | pyridyl | n-C₄H₉ | n-C₄H₉ | —Cl | —Cl | Cl | H |
| 44 | thiazolidine (NH, S) | S | S | —CH₂CH₂CH₂— | | H | H |
| 45 | thiazole (NH, S) | H | S | —CH₂CH₂CH₂CH₂— | | H | H |

TABLE—Continued

| Example number | R | $R^1$ | $R^2$ | $X^1$ | $X^2$ | $X^3$ | $X^4$ |
|---|---|---|---|---|---|---|---|
| 46 | —H$_2$C—(pyridyl) | n-C$_4$H$_9$ | n-C$_3$H$_7$ | —CN | H | H | H |
| 47 | —H$_2$C—(piperidyl, NH) | n-C$_3$H$_7$ | n-C$_3$H$_7$ | —CF$_3$ | H | H | H |
| 48 | (thienyl) | n-C$_4$H$_9$ | n-C$_3$H$_7$ | —Cl | H | Cl | H |
| 49 | (thienyl) | | —CH$_2$CH$_2$CH$_2$CH$_2$— | —CO$_2$H | H | H | H |
| 50 | (thienyl) | | —CH$_2$CH$_2$CH$_2$CH$_2$CH$_2$— | —CF$_3$ | H | H | H |
| 51 | —CH$_2$CH=CH$_2$ | n-C$_5$H$_{11}$ | n-C$_5$H$_{11}$ | —Cl | H | H | H |
| 52 | —CH$_2$C≡CH | n-C$_4$H$_9$ | n-C$_4$H$_9$ | —Cl | H | H | H |
| 53 | (thienyl) | n-C$_4$H$_9$ | n-C$_4$H$_9$ | —NO$_2$ | —NO$_2$ | H | H |
| 54 | —CH$_2$—(thienyl) | | —CH$_2$CH$_2$OCH$_2$CH$_2$— | —Cl | —Cl | H | H |
| 55 | Cl<br>—CH—CH$_2$—CHCl$_2$ | n-C$_4$H$_9$ | n-C$_4$H$_9$ | —F | H | H | H |
| 56 | (pyrrolyl) | n-C$_4$H$_9$ | n-C$_4$H$_9$ | —Cl | —Cl | H | H |

The novel compounds of this invention are uricosuric agents which can be administered in a wide variety of therapeutic dosages in conventional vehicles as, for example, by oral administration in the form of a tablet or by intravenous injection. Also, the daily dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products which may be administered in a total daily dosage of from 100 mg. to 2000 mg.

A suitable unit dosage form of the products of this invention can be administered by mixing 50 milligrams of an N-acetyl-4-di-n-butylsulfamoyl - 3 - trifluoromethylbenzenesulfonamide or a suitable salt with 149 mg. of lactose and 1 mg. of magnesium stearate and placing the 200 mg. mixture into a No. 2 gelatin capsule. Similarly, by employing more of the active ingredient and less lactose, other dosage forms can be put up in No. 2 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known uricosurics or with other desired therapeutic and/or nutritive agents in dosage unit form.

The following example is included to illustrate the preparation of a representative dosage form:

EXAMPLE 57

Dry-filled capsules containing 50 mg. of active ingredient per capsule

|  | Per Capsule mg. |
|---|---|
| N-Acetyl-4-Di-n-butylsulfamoyl - 3 - trifluoromethylbenzenesulfonamide | 50 |
| Lactose U.S.P. | 149 |
| Magnesium Stearate U.S.P. | 1 |
| Capsule (Size No. 2) | 200 |

The N - acetyl-4-di-n-butylsulfamoyl-3-trifluoromethylbenzenesulfonamide is reduced to a No. 60 powder and then lactose and magnesium stearate are passed through a No. 60 bolting cloth onto the powder and the combined ingredients admixed for 10 minutes and then filled into a No. 2 dry gelatin capsule.

Similar dry-filled capsules can be prepared by replacing the active ingredient of the above example by any of the other novel compounds of this invention.

We claim:
1. A compound having the formula:

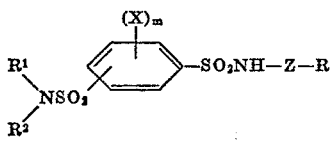

wherein R is pyridyl bonded either directly via a nuclear carbon or bonded indirectly via a methylene chain to the carbonyl or sulfonyl moiety represented by Z; $R^1$ is hydrogen, lower alkyl of 1–4 carbon atoms or cycloalkyl of 5–6 nuclear carbon atoms; $R^2$ is lower alkyl of 1–6 carbon atoms or cycloalkyl of 5–6 nuclear carbon atoms; X is halo, methyl, nitro, trihalomethyl, cyano or carboxy or two X radicals on adjacent carbon atoms may be joined to form a hydrocarbylene chain containing from 3–4 carbon atoms between their points of attachment; Z is carbonyl or sulfonyl and $m$ is an integer having a value of 0–4 and the non-toxic, pharmaceutically acceptable salts thereof.

2. A compound according to Claim 1 having the formula:

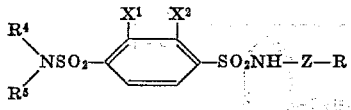

wherein R is pyridyl bonded either directly via a nuclear carbon or bonded indirectly via a methylene chain to the carbonyl or sulfonyl moiety represented by Z; $R^4$ and $R^5$ are lower alkyl containing from 1–6 carbon atoms; $X^1$ and $X^2$ are hydrogen, halo, methyl, trihalomethyl or nitro or, taken together with the nuclear carbon atoms to which they are attached, $X^1$ and $X^2$ may be joined to form a 1,3-butadienylene chain and Z is carbonyl or sulfonyl and the non-toxic, pharmaceutically acceptable salts thereof.

3. N-(2 - pyridylcarbonyl)-2,3,5-trichloro-4-di-n-butyl-sulfamoylbenzenesulfonamide.

4. N-(2 - pyridylacetyl)-3-cyano-4-di-n-butylsulfamoyl-benzenesulfonamide.

References Cited

UNITED STATES PATENTS 3,560,563  2/1971  Childress et al.  260—556 AC
3,471,559  10/1969  Scherrer  260—556 AC ALAN L. ROTMAN, Primary Examiner U.S. Cl. X.R.

260—247.1, 293.73, 326.3, 332.2 C, 294.9, 347.2, 544 M, 515 M, 556 AC; 424—248, 263, 267, 274, 285, 321